Jan. 27, 1959 P. C. TEMPLE 2,870,553
REMOTE CONTROLLED HYDRAULIC VALVE ASSEMBLY
Filed Dec. 30, 1954 7 Sheets-Sheet 6

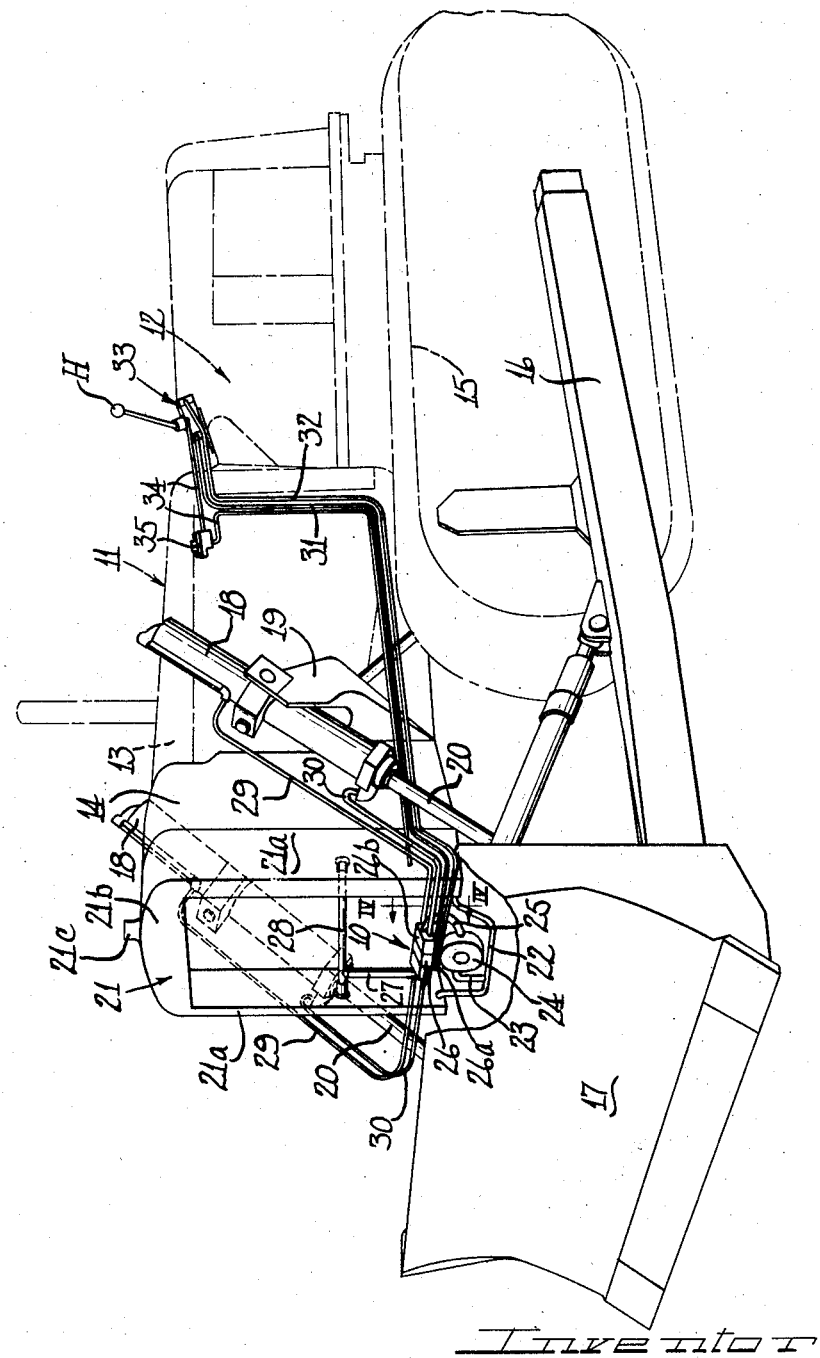

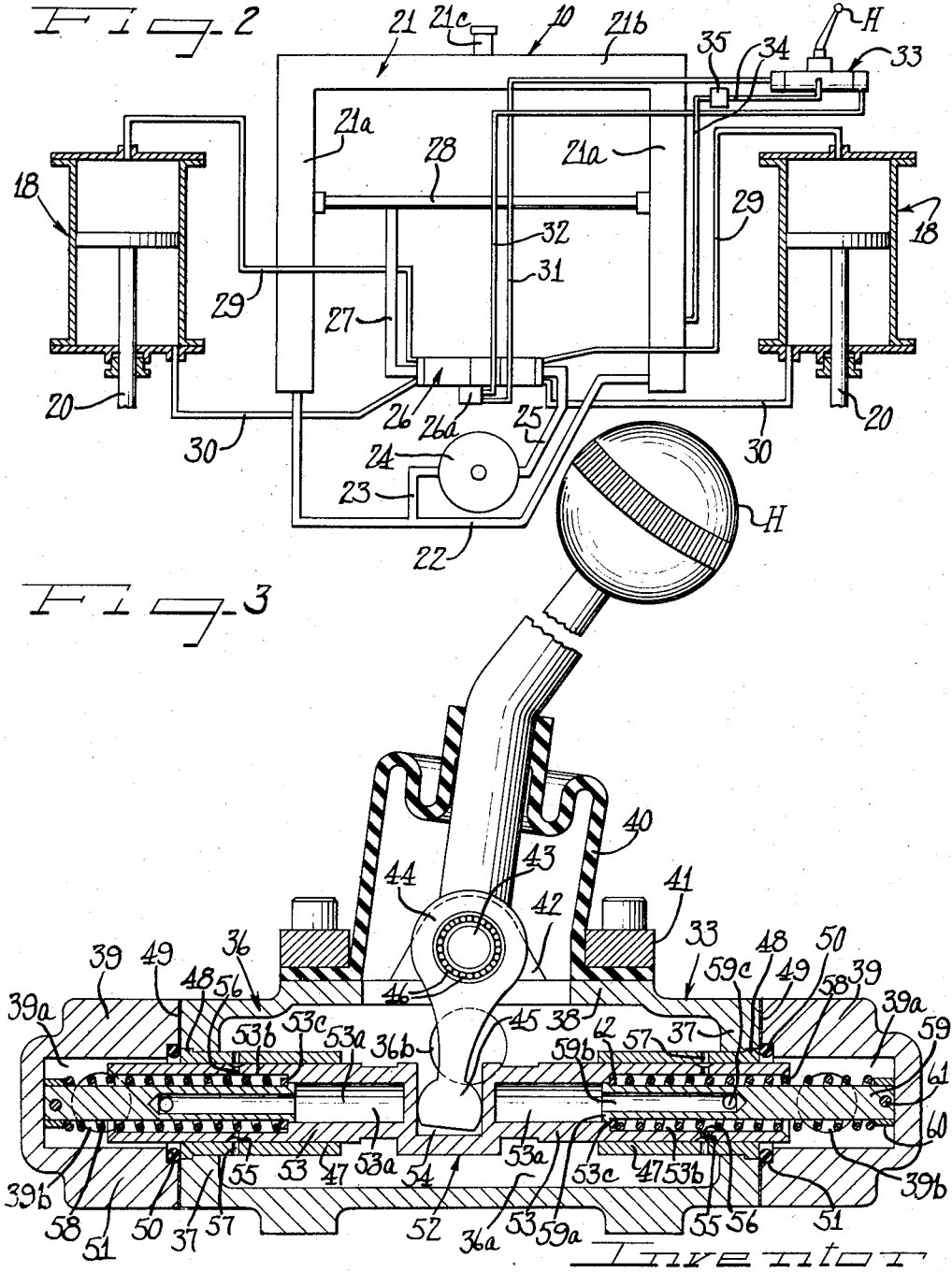

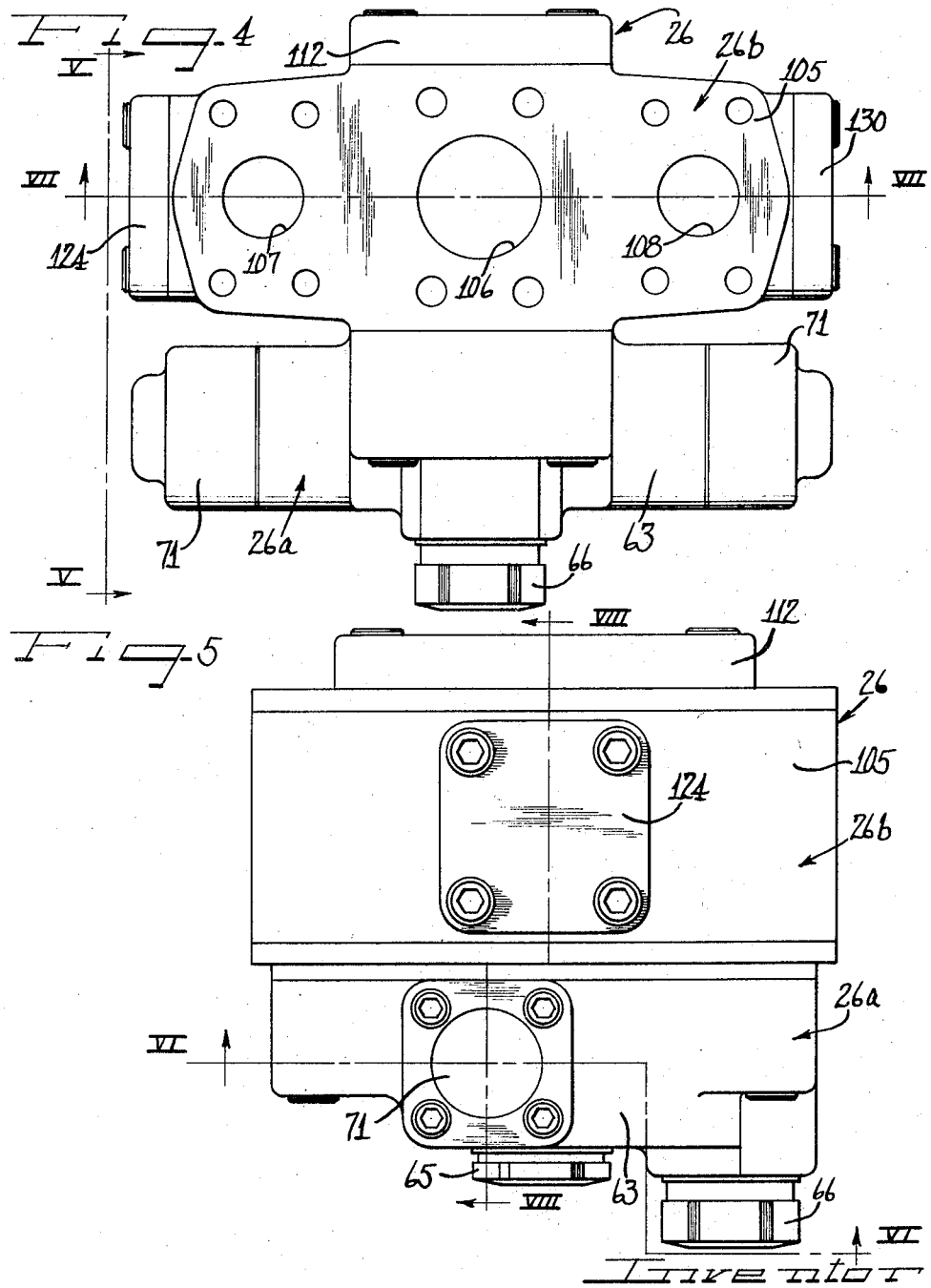

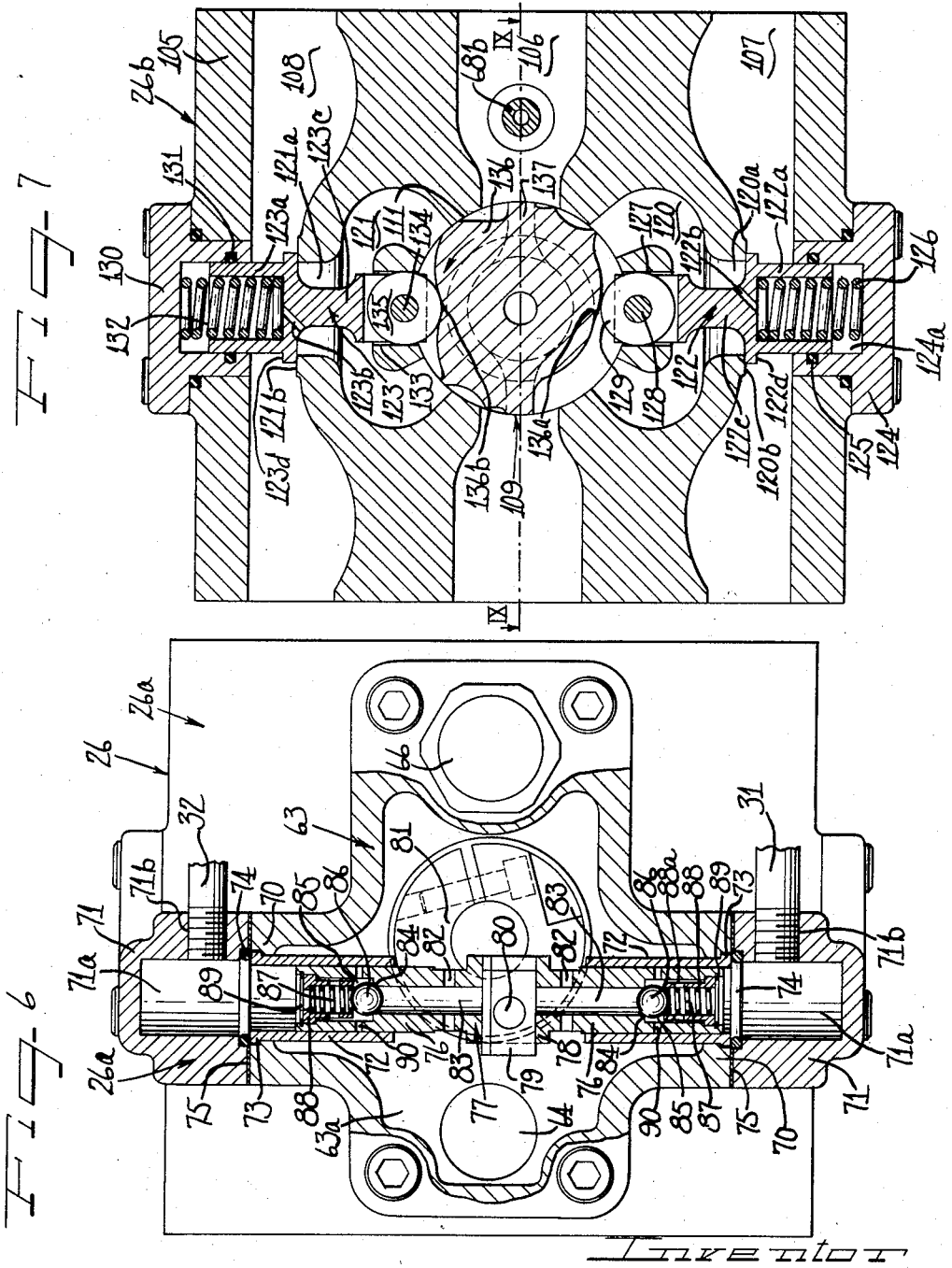

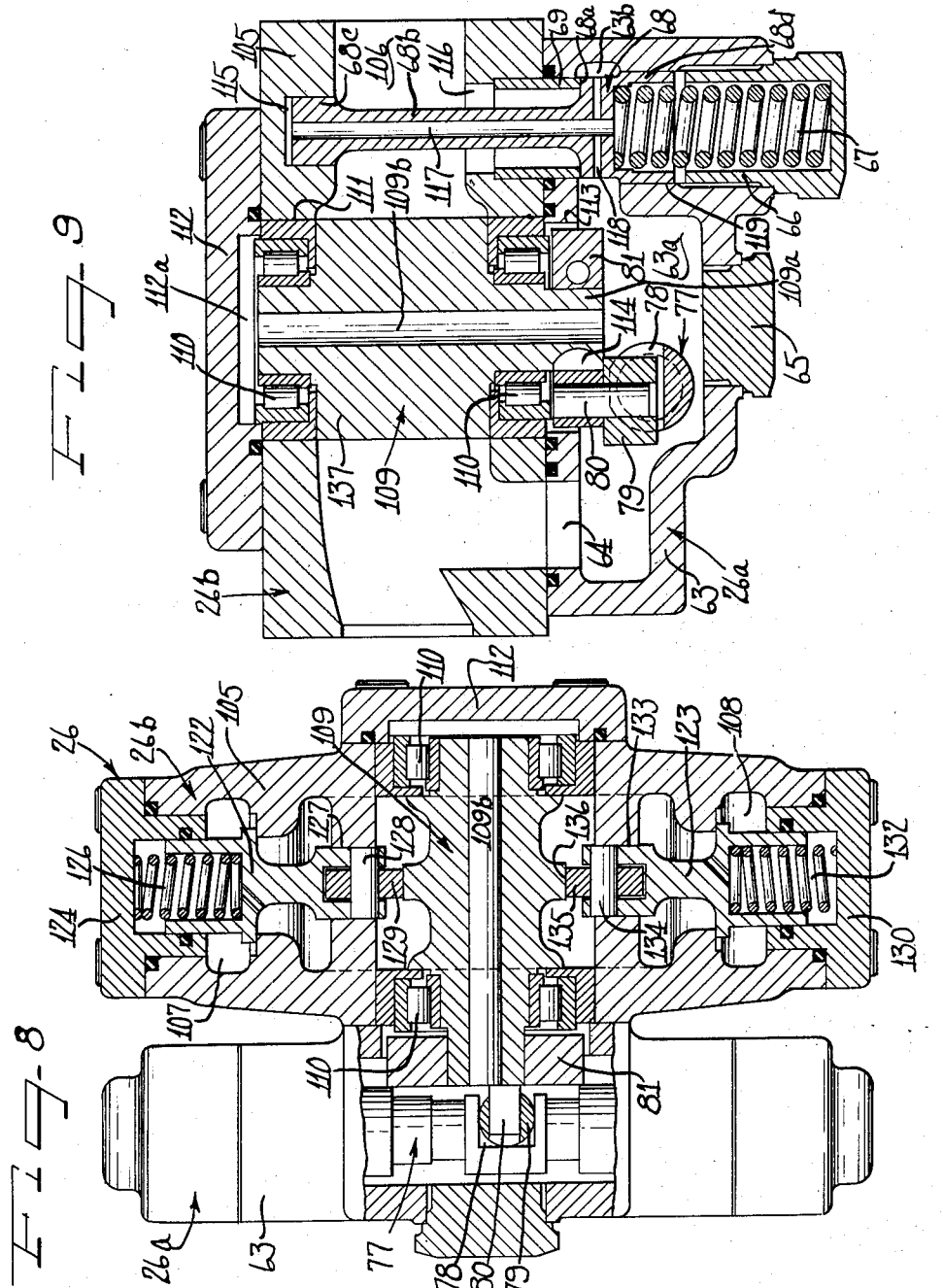

Inventor
Paul C. Temple

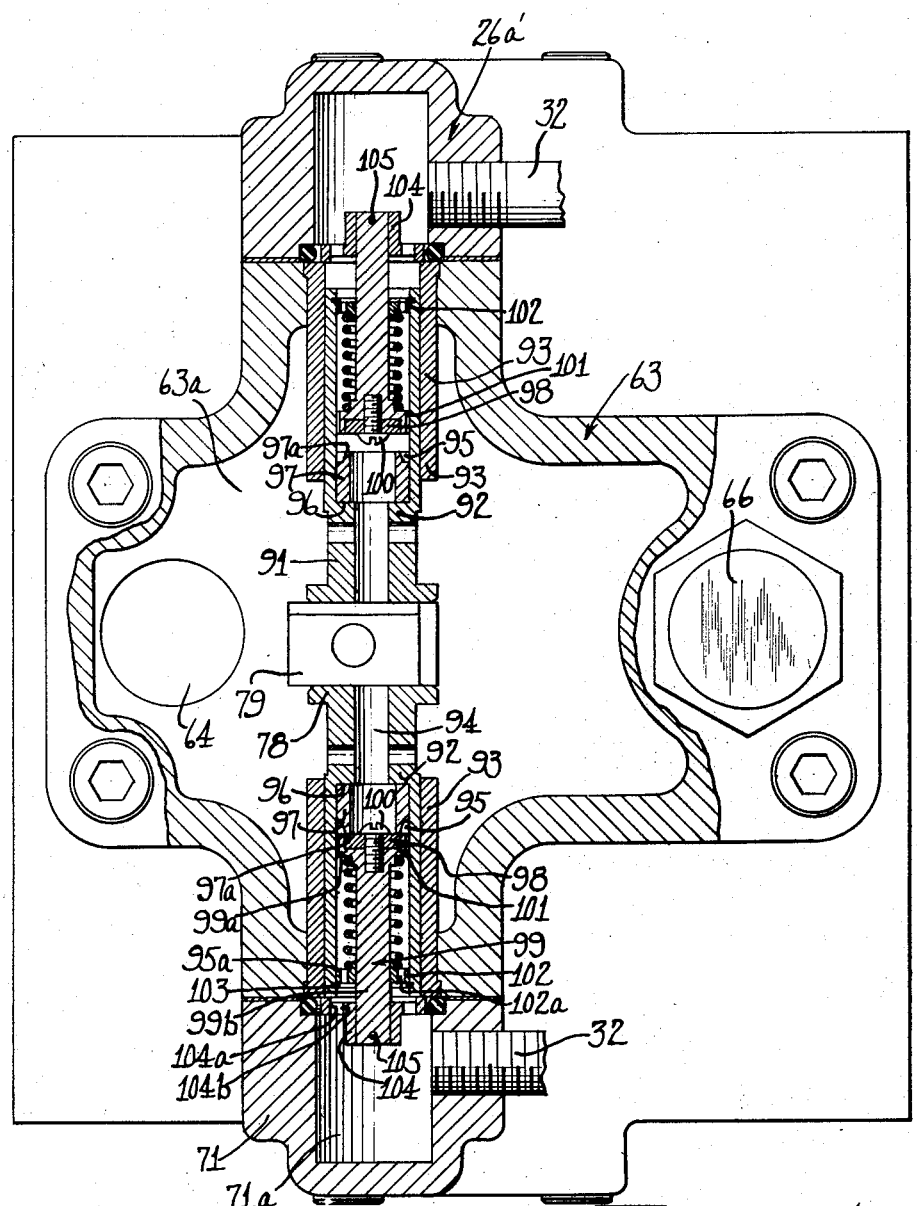

United States Patent Office 2,870,553
Patented Jan. 27, 1959

2,870,553

REMOTE CONTROLLED HYDRAULIC VALVE ASSEMBLY

Paul C. Temple, Springfield, Ill., assignor, by mesne assignments, to Allis-Chalmers Manufacturing Company, a corporation of Delaware Application December 30, 1954, Serial No. 478,613

23 Claims. (Cl. 37—144)

This invention relates to fluid control systems embodying flow control valves operated from remote senders through the media of the same fluid which they control. Specifically, this invention relates to a hydraulic system for operating bulldozers, snowplows, shovels, and the like vehicle-mounted implements wherein the hydraulic fluid supply tank, the pump, the hydraulic motors or rams, and the main control valve, are all closely grouped to eliminate heretofore required linkages and heretofore encountered pressure drop losses and intake suction losses, and wherein the main control valve is controlled from a remote manually actuated sender with the same fluid which it controls whereby the system is self-charging and ready for use as soon as the pump propels the fluid.

This invention will hereinafter be specifically described as embodied in a remote controlled hydraulic valve assembly for a hydraulic ram-actuated bulldozer on a tractor but it should be understood that the invention is not limited to the preferred illustrated embodiment since it will be appreciated by those skilled in the art that the assembly and units of this invention are generally useful in fluid systems.

According to this invention, a hydraulic fluid supply tank is mounted in front of a tractor radiator at the front end of a bulldozer machine. This tank is preferably U-shaped so as not to block air flow through the tractor radiator. The legs of the U are interconnected to a supply pipe which feeds a pump that is directly coupled to the tractor engine and is also mounted on the front of the bulldozer machine. The pump, in turn, supplies the fluid to a main control valve and this valve either directs the fluid back to the tank or the upper or lower ends of hydraulic ram cylinders which control the level of the bulldozer blade. A receiver capable of converting differences in hydraulic pressure into mechanical movement for actuating the main valve is mounted immediately adjacent the main valve. This receiver receives fluid from the main valve under the back pressure in which the system operates and directs this fluid through tubes to a remote manually actuated sender unit which is located within convenient reach from the tractor operator's station. The fluid received by the sender, in the neutral position of the sender, is directed through a tube back to the tank so that during all periods when the level of the bulldozer blade is not being changed, the same fluid which circulates through the main control valve also circulates through the receiver and sender. When it is desired to shift the level of the bulldozer blade, the sender is manually actuated to block off the free flow of fluid from one or the other ends of the receiver and this block is immediately followed by a displacement of fluid which will shift the receiver to effect movement of the main valve, thereby changing the course of flow of the hydraulic fluid from the pump to establish movement of the hydraulic rams.

An important feature of this invention, therefore, resides in use of the main hydraulic fluid to establish operating communication between the receiver and sender thereby eliminating all of the problems attendant with systems having isolated fluid circuits for the sender and for the main control valve.

Another feature of the invention resides in the arrangements of the parts of the system to confine the main fluid flow to a small zone thereby minimizing pressure drops, leakage losses, and pump intake losses.

A very important feature of the invention is the provision of a main fluid circuit adapted to re-circulate the fluid from the tank to the pump through the valve and back to the tank with the least possible effort thereby minimizing fluid temperature rises commonly occurring in re-circulating fluid systems.

An object of the invention is to provide a remote hydraulic controlled hydraulic valve which is self-charging and uses control fluid from the same source as the operating fluid.

Another object of this invention is to provide a hydraulic system especially adapted for operation of implements on vehicles wherein the flow of the main operating fluid is confined to a small zone while the system is hydraulically controlled from a remote station.

A further object of the invention is to provide a bulldozer hydraulic actuating system with the hydraulic fluid tank, the main pump, and the main valve mounted on the front end of the machine for actuating front end mounted hydraulic rams wherein the main valve is hydraulically controlled from a remote sender at the operator's station through the media of the same hydraulic fluid flowing through the valve.

A specific feature of the invention is the provision of self-aligning piston cylinders in valves to eliminate stresses and to increase tolerance limits.

A further specific feature of the invention is the provision of automatic centering springs for control pistons in valves and the like.

Another object of the invention is the utilization of springs which have a maximum extended length to give a positive "feel" in the operation of hydraulic systems and thereby eliminate heretofore encountered "mushiness" due to variable spring lengths in control valves.

A further specific feature of the invention is to provide a self-centering sender for a hydraulic control system which will automatically shift the manually actuated control handle to a centered neutral position after each manual displacement of the handle.

A still further object of the invention is to provide a rotary blade valve mechanism with a free recirculation position which locks fluid in a hydraulic motor controlled by the valve, which positively drives the motor in two directions, and which permits the motor to "float."

A specific feature is to provide a rotary valve mechanism having a plurality of cam-controlled poppet valves wherein a hydraulic control is superimposed on at least one of the poppet valves to prevent any possibility of poppet valve opening until the upstream pressure in the rotary valve is higher than the pressure downstream from the poppet valve.

A further object of the invention is to provide a cam-controlled poppet valve type flow valve with a built-in lag to insure sealing of the valve directing vane before the cams open the poppet valves.

Other and further objects of this invention will be apparent to those skilled in the art from the following detailed description of the annexed sheets of drawings which, by way of preferred examples, illustrate several embodiments of the invention.

On the drawings:

Figure 1 is a perspective view of a bulldozer mounting and control system according to this invention and illustrating in phantom outline the tractor on which the equipment is mounted.

Figure 2 is a diagrammatic view illustrating the flow circuit of the hydraulic system of this invention.

Figure 3 is a longitudinal cross-sectional view, with parts in elevation, of the sender unit of this invention.

Figure 4 is an end elevational view of the main valve and receiver unit for the hydraulic system taken along the line IV—IV of Figure 1.

Figure 5 is a side elevational view of the unit of Figure 4 taken along the line V—V of Figure 4.

Figure 6 is a cross-sectional view, with parts in elevation, of the unit of Figures 4 and 5 taken along the line VI—VI of Figure 5.

Figure 7 is a cross-sectional view of the main valve taken along the line VII—VII of Figure 4.

Figure 8 is a cross-sectional view, with parts in elevation, taken along the line VIII—VIII of Figure 5.

Figure 9 is a cross-sectional view taken along the line IX—IX of Figure 7.

Figure 13 is a view similar to Figure 6 but illustrating a modified form of receiver.

As shown on the drawings:

The bulldozer machine

Figure 10:
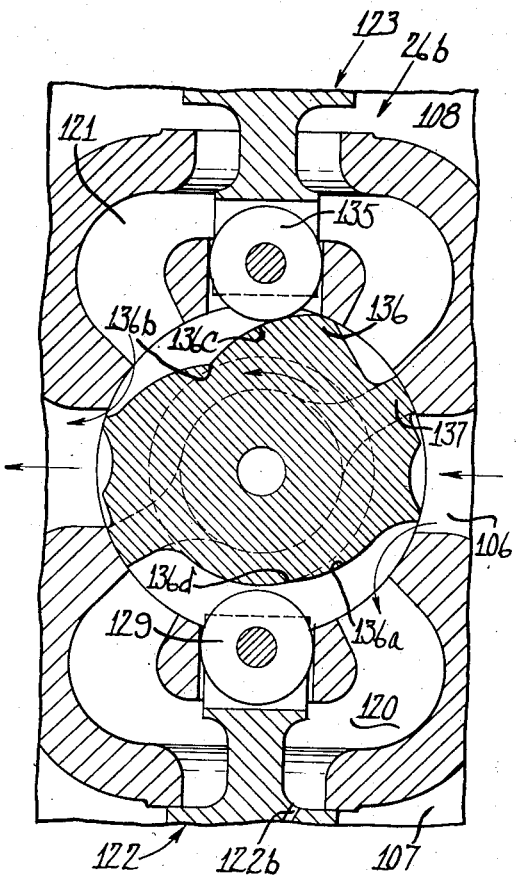
Figures 10 and 11 are fragmentary cross-sectional views of the main control valve along the same plane as Figure 7 and illustrating the various operating positions of the valve.

The fluid control system 10 of this invention is generally illustrated in Figures 1 and 2 and, as shown in Figure 1, is mounted on a bulldozer machine 11. The bulldozer machine 11 includes a conventional tractor 12 with a motor compartment 13 at the front end thereof having the conventional engine cooling radiator 14 as the front wall thereof. Crawler tracks such as 15 propel the tractor 12 and support the tractor body. Push beams such as 16 are pivotally mounted on the tractor on the outside of the crawler tracks 15 and support the bulldozer blade 17 which extends transversely across the front end of the tractor forwardly from the radiator 14.

A pair of hydraulic rams or cylinders 18 are pivotally mounted on brackets 19 carried by the tractor body and have the piston rods 20 thereof connected to the bulldozer frame for raising and lowering the implement relative to the tractor.

It should be understood that any suitable mounting of bulldozer frame and operating hydraulic rams on a tractor or the like vehicle can be used with the hydraulic system of this invention.

The hydraulic system in general

The system 10 of Figures 1 and 2 includes a U-shaped tank 21 mounted in front of the tractor radiator 14 in such a manner so as not to impede the flow of air through the radiator. The tank thus has vertical side legs 21a at the sides of the radiator and a horizontal bight portion 21b overlying the top of the radiator with a filler opening 21c at a convenient location in the top. The tank 21 is filled with hydraulic fluid such as oil.

The bottoms of the tank legs 21a are connected through a cross-pipe 22 with the intake 23 of a pump 24 that is directly driven from the power take-off of the tractor engine at the front of the tractor. This pump can be a gear pump or any other suitable type capable of supplying the hydraulic fluid under pressure to the pressure side of the system.

The pump 24 discharges through an outlet 25 into the control valve and receiver unit 26 of this invention. This unit 26 has a return circulating outlet 27 connected to a cross-pipe 28 discharging into the side legs 21a of the tank at a level above the outlet pipe 22. Thus, the pump is adapted to receive fluid from the bottom of the legs 21a, feed the fluid through the valve unit 26 and discharge the fluid back to the legs 21a at a level above the intake sufficient for the maintaining of a back operating pressure in the valve unit 26. The valve unit 26 includes a main flow control sub-unit 26b and a receiver 26a for operating the main valve unit.

The main valve 26 has three ports in each end. The center port in one end receives the inlet pipe 25 from the pump 24 while the corresponding center port in the opposite end receives the outlet pipe 27. The outer ports at each end are respectively connected to the upper and lower ends of the hydraulic cylinders 18 through pipe conduits 29 and 30 respectively. The valve is so arranged that when fluid under pressure from the pipe 25 is diverted from direct recirculation to the pipe 27, the diverted fluid will be directed into corresponding ends of the operating rams while the opposite ends of these rams will have the fluid circulated back through the valve to the discharge pipe 27, thereby effecting a shifting of the pistons and piston rods 20 to vary the level of the bulldozer blade. In another position of the valve, of course, the fluid will be locked in the cylinders to hold the blade at a fixed level but flow between corresponding ends of both cylinders is accommodated through the valve to place the cylinders in intercommunication, thereby preventing an overloading of one ram.

The receiver unit 26a receives hydraulic fluid from the unit 26b and discharges this fluid through tubes 31 and 32 discharging into opposite ends of a sender 33 mounted on the tractor adjacent the tractor operator's seat or within convenient reach of this seat. The sender 33 discharges this fluid through a tube 34 communicating back to the lower portion of one of the legs 21a of the tank. A back pressure maintaining or vacuum breaking valve 35 is interposed in the tube line 34.

The operation of the system 10 is such that when the manually controlled operating handle H of the sender unit 33 is shifted either forwardly or rearwardly from its neutral mid-position, free circulation of fluid fed to the sender through the tubes 31 and 32 is arrested. The trapped fluid in the tubes is thereupon shifted in accordance with the movement of the sender piston to effect a corresponding movement of the receiver, thereby shifting the main valve 26b.

A feature of the system resides in the "feel" of operation of the valve effected by a valve cam or lifting member. This "feel" makes possible a convenient "float" position for the valve 26b wherein fluid can flow freely to and from both ends of the hydraulic rams and the bulldozer blade will rest or "float" on the ground under the influence of gravity alone. This "float" position is accomplished by full manual displacement in one direction of the sender handle.

The sender unit

The sender unit 33, as best shown in Figure 3, comprises a main housing or casing 36 of tubular or rectangular shape with centrally apertured end walls 37 and an apertured top pad 38. End caps 39 are mounted over the end walls 37 and a rubber boot 40 is mounted over the pad 38 and sealingly clamped thereon by a clamping ring 41. Ears 42, in diametrically opposed position on the pad 38, carry a cross pin 43 straddling the top opening in the casing and supporting a shifting finger 44 having a ball end 45 in the main chamber of the casing and an operating handle H projecting upwardly through the boot 40. Anti-friction bearings 46 can be provided on the cross pin or shaft 43 to mount the finger.

The apertured end walls 37 of the main casing 36 receive cylinders 47 through the apertures thereof and each cylinder has an enlarged end flange or head 48 seated in a counterbore at the outer end of the apertured wall. A gasket 49 is provided between each end cap 39 and end wall 37 and a rubber sealing ring 50 of circular cross section is seated in a counterbore 51 in the mouth of each end cap 39 to sealingly engage the outer end of the adjacent cylinder flange 48.

Each cylinder 47 fits freely in the bore and counterbore of its end wall 37 and the sealing ring 50 prevents leakage through any open gap or path afforded by this loose fit. The arrangement is such that the cylinders 47 are in opposed alignment with each other and can easily be shifted into exact alignment due to the loose fit and the resiliency of the sealing rings 50.

A double piston unit 52 has cylindrical hollow pistons 53 at the opposite ends thereof, snugly slidably fitted in the cylinders 47. A well 54 is provided between the pistons 53 to rockably receive the ball end 45 of the actuating finger 44.

Each piston 53 has an open end communicating with the chamber 39a in each end cap 39 and a closed inner end sealed from the chamber 36a of the main casing 36. Each end cap has a port 39b communicating with the chamber 39a thereof and the main casing 36 has a port 36b communicating with the chamber 36a thereof. One port 39b is joined with the tube 31, the other port 39b is joined with the tube 32, and the port 36b is joined with the return tube 34 described above.

Each piston 53 has a small diameter bore 53a at the inner end thereof and a larger diameter bore 53b extending through the outer end thereof with a radial shoulder or step 53c between the two bores. Each piston also has an external groove 55 radially around the periphery thereof about midway between the ends of the bore 53b and this groove communicates through a plurality of radial ports 56 with the bore 53b. The groove 55 is adapted to register with a ring of radial ports 57 in the cylinder 47 when the piston is positioned to align the ports and groove.

Centering springs 58 are provided for urging the pistons into neutral position with the grooves 55 in alignment with the ports 57. Each spring 58 surrounds a pin 59. A collar 60 is pinned on the outer end of each pin 59 by a cross pin or dowel 61 and the outer end of the spring 59 is bottomed on this collar. The opposite end of the pin 59 has an outturned flange 59a snugly fitting in the piston bore 53a in sliding relation. This flanged end of the pin 59 has a bore 59b extending inwardly from the flanged end to a cross hole 59c communicating with the bore 53b of the piston. A washer 62 is slidably mounted on the pin 59 and is adapted to thrust against the flange 59a of the pin and the shoulder 53c of the piston. The spring 58 is bottomed on this washer.

The pin and spring arrangement is such that the spring will always have the same expanded length and will be maintained under the exact desired expanded length load to urge the piston assembly 52 to its neutral position with a positive "feel." As shown, the pins 59 are bottomed against the end caps 39 but are not affixed to the end caps so that the flanges 59a of the pins will ride smoothly in the bore 53a of the pistons.

When the handle H is shifted to the right or left in the plane shown in Figure 3, the finger 44 will be rocked above the shaft 43 to cause the ball end 45 thereof to shift the piston unit 52. One of the springs 58 will thereupon be compressed since the washer 62 at the end of this spring will be forced back on the pin 59 away from the flange 59a. This shifting of the piston unit will move the grooves 55 of both end pistons 53 out of registration with the cylinder ports 57 thereby blocking free flow of fluid from the ports 39b through the piston bores 53b, piston ports 56 and cylinder ports 57, to the chamber 36a for free flow out through the port 36b back to the tank. The piston unit 52 in effect serves as a manually actuated fluid trapping means for displacing the trapped fluid ahead of the advancing piston back through the tube 31 or 32 from which it was fed to actuate the receiver sub-unit 26a. The compressed spring of the advancing piston, of course, will tend to return the piston to its neutral position shown in Figure 3 as soon as the handle is released.

From the above description it should readily be understood that important features of the sender include a one-piece double piston which will give positive double action in the control of the system of this invention, self-aligning piston cylinders which increase allowable tolerance limits without any chance of binding the pistons, automatic centering springs for the pistons, spring mountings which accurately control the expanded maximum length of each spring to eliminate mushiness due to variable spring lengths and to position the pistons to a given neutral point with great accuracy, and end caps which can be misaligned without causing any binding of the pistons in their cylinders.

*The receiving unit*

As shown in Figures 4, 5, 6, 8 and 9, the receiving sub-unit 26a of the unit 26 includes a main casing 63 with a main central chamber 63a receiving hydraulic fluid through a port 64 (Figures 6 and 9) from the main valve sub-unit 26b. A plug 65 closes an opening in the casing 63 affording access to the chamber 63a and a boss portion on the casing carries a plug 66 bottoming a spring 67 which acts on a relief valve 68 slidably carried in a bore of the boss as shown in Figure 9. The piston or relief valve 68 has a head portion 68a seating on a sleeve 69 projecting into a recess 63b of the chamber 63a and surrounding the piston head. The piston has a stem 68b slidably carried or guided in a recess in the casing of the main valve unit 26a as will be more fully hereinafter described.

As shown in Figure 6, the casing 63 has apertured end walls 70 similar to the end walls 37 of the sender casing shown in Figure 3. End caps 71 secured over the end walls define chambers 71a in communication with cylinders 72 carried by the end walls and having flanges 73 seated in counterbores in the end walls and sealed relative to the end caps by seal rings 74. Gaskets 75 are provided between the caps and the end walls and ports 71b are provided in the caps communicating with the chambers 71a thereof to receive the tubes 31 and 32 respectively. The cylinders 72 project into the casing chamber 63a in spaced opposed relation and each receives the end pistons 76 of a piston unit 77 that has a cross-head slide or recess 78 in the central portion thereof slidably mounting a cross-head 79. A pin 80 projecting from a crank clamp 81 locked to the hub of the vane plug unit of the main valve 26b pivotally connects the cross-head to the plug.

The piston unit 77 has cross-holes 82 on each side of the cross-head 79 communicating with longitudinal bores 83 in each of the pistons 76. These bores extend to check valve seats 84 at the bottoms of counterbores 85 in the outer ends of the pistons. Ball checks 86 coact with the seats 84 and are urged against the seats by springs 87 seated in thimble sleeves 88 which are held in the central portions of the counterbores 85 by end heads pressed by locking rings 89 against shoulders in the outer ends of the pistons. The thimble sleeves 88 are of smaller diameter than the interior of the bore of the piston into which they project and have ports 88a therethrough accommodating flow through the thimbles.

Dump ports 90 are provided in each piston 76 on the downstream side of the valve seat 84 thereof. These ports 90 are normally closed by the cylinders 72 but in the event that the sender is operated so as to propel trapped fluid against a receiver piston in an amount sufficient to move the ports 90 beyond the inner end of the cylinder, the excess fluid will be dumped into the chamber 63a so that an excessive pressure cannot be developed in the trapped fluid circuit even though sender piston displacement is not balanced relative to receiver piston displacement.

In the at-rest condition of the system where free circulation of the hydraulic oil occurs, the oil flows into the chamber 63a from the port 64, enters the ports 82 of the pistons 76 and flows through the bores 83 to unseat the check valves 86. The fluid will then flow through the bores 85 and ports 88a of the thimbles 88 into the end cap chambers 71a for flow through the tubes 31 and 32 into the sender where it will flow freely through the ports of the sender pistons and cylinders into the chamber 36a and thence back to the tank via the port 36b and tube line 34. This free flow from the receiver to the sender is immediately arrested when the sender handle H is shifted to misalign the piston and cylinder ports whereupon the oil is trapped and the column of trapped oil which is moved by the advancing sender piston will act against the corresponding receiver piston closing the check valve and driving the receiver to shift the main valve. Of course, reciprocation of the receiver piston reciprocates the cross-head 79 which, in turn, slides in its groove and drives the pin 80 for rotating the crank that is locked on the plug of the main valve.

In the modified receiver arrangement 26a' of Figure 13, parts identical with parts described in Figures 4 to 6, 8 and 9 have been marked with the same reference numerals.

The modified form 26a' has a check valve arrangement which will eliminate the necessity for the ports 90 of the unit 26a and will make possible a longer supporting length for the pistons in the cylinders. In the modification, the check valves are arranged so as to be opened to bleed or dump excess trapped oil in the event that movement of the sender piston moves more oil than can be accommodated by the stroke of the receiver piston.

In the sub-unit 26a', a piston unit 91 has end pistons 92 on opposite sides of the cross-head slide 78. These pistons 92 are slidably mounted in cylinders 93 carried from the casing 63 in the same manner as described in connection with Figure 6 but having a longer length. The pistons 92 have a small diameter bore 94 extending from the cross-head guide 78 to a larger diameter bore 95 extending through the opposite end of the piston. A shoulder 96 is provided between the bores 94 and 95 at a point in each piston remote from the open outer end thereof. A valve seat sleeve 97 is press fitted into the bore 95 against the shoulder 96. This sleeve has a reduced diameter seating face 97a coacting with a plastic or synthetic rubber insert 98 of a stemmed valve 99. The valve 99 has a hexagonal head 99a with a recess in the end face carrying the insert 98 and receiving a screw 100 for securing the insert in position. The head 99 has sliding contact with the bore 95 but since the head is polygonal the flat peripheral faces thereof provide passages 101 around the periphery of the head. The stem 99b of the valve 99 is slidably guided in an apertured collar 102 carried in the piston bore 95 on a shoulder 95a thereof and held in position by a snap-ring 103 fitted in the groove provided in the bore. This collar 102 has passages 102a accommodating flow of fluid therethrough.

A head member 104 is pinned on the end of the valve stem beyond the bore 95 and beyond the end of the cylinder 93 by means of a cross-pin 105. This head or cap has an apertured flange 104a overlying the end edge of the piston and adapted to thrust against the end flange of the cylinder 93. Passages 104b through the flange accommodate free flow of fluid.

In free circulating condition of the system, the hydraulic oil from the chamber 63a will flow into the passage 94 of the piston to act against the valve head 99a thereby unseating the valve off the seat 97a. The oil will flow around the valve head through the passages 101, through the apertures 102a of the collar 102, and through the apertures 104b of the head or cap 104 into the chambers 71a of the end cap 71 and thence through the tubes 31 and 32 to the sender. When the free flow of oil through the sender is stopped by shifting of the pistons, end pressure on the corresponding receiver piston will shift this piston toward the inner end of its cylinder sleeve 93. However, when the end head or cap 104 carried by the check valve assembly 99, strikes against the end of the cylinder 93, it will limit further movement of the valve with the piston whereupon further movement of the piston will move the seat 97a away from the valve thereby dumping out excess oil into the passage 94 as shown in the upper piston 92 of Figure 13. This check valve arrangement therefore serves the added function of an automatic dump valve control and eliminates the necessity for the dump ports 90 in the embodiment shown in Figure 6. It will be appreciated, of course, that movement of the valve 99 off of its seat by oil pressure existing in the passage 94 will effect corresponding movement of the end head 104 away from the end of the cylinder 93.

From the above descriptions it will therefore, be understood that both of the receiver embodiments of Figures 6 and 13 include a self-dumping control for relieving excess trapped oil in the event that the system is unbalanced and the movement of the receiver piston causes movement of a greater volume of oil than can be accommodated by the piston displacement in the receiver. It is, therefore, not necessary to exactly correlate the relative displacements of the sender and receiver pistons or plungers.

*The main flow control valve*

The main control valve sub-unit 26b of the unit 26, as shown in Figures 4, 5, and 7 to 11, has a flat rectangular block-like main casing 105 with three aligned passages extending from end to end thereof and including a middle feed and return fluid passage 106 for free recirculation of the hydraulic oil therethrough, a working fluid passage 107 on one side of the passage 106 for communicating at its ends with the tubes 29 to the upper ends of the hydraulic cylinders 18 and a working fluid passage 108 on the opposite side of the passage 106 joined at its ends with the tubes 30 to the lower ends of the hydraulic cylinders 18. The central passage 106 receives the intake pipe 25 at one end thereof and the discharge pipe 27 at the other end thereof.

A main rotary control plug 109 is rotatably mounted on anti-friction bearings 110 carried by the casing at the ends of a cylindrical bore 111 which intersects the passage 106. One end of the bore is closed by an end cap 112 secured on the casing 105 while the other end of the bore registers with a port 113 in the receiver casing as shown in Figure 9. The plug 109, as explained above, has a neck portion 109a projecting beyond the bearing 110 through the port 113 and receiving the crank pin head 80 in clamped relation therewith. A driving key 114 is provided between the head 81 and the neck 109a.

The valve member 109 has a bore 109b therethrough communicating at one end with a chamber 112a in the cap 112 and at the other end with the chamber 63a of the receiver casing 63. This bore 109b equalizes pressures on opposite ends of the vane member.

On the pressure inlet side of the passage 106, there is provided a blind well or recess 115 slidably guiding an enlarged end 68c on the valve stem 68b referred to above in connection with the receiver of Figure 9. The valve stem 68b traverses the passageway 106 and fits freely through a port 116 in the casing 105 which port has the sleeve 69 pressed therein and extending therefrom through a corresponding port in the receiver casing 63 to form the seat for the valve head 68a. The stem 68b of the valve is hollow having a passage 117 therethrough communicating at one end with the recess 115 and at the other end with the chamber receiving the spring 67. A cross-bore 118 also joins this port with the chamber 63a of the receiver so that both the spring chamber and the recess 115 will be at the pressure existing in chamber 63a.

The valve 68 has a cylindrical projection 68d on its head slidable in the bore 119 provided in the nipple portion of the casing 63 which receives the plug 66. The spring 67 is bottomed on the valve head in this cylindrical extension and the valve head coacts with a seat provided by the end of the sleeve 69. The spring 67, of course, urges the valve head against its seat but when pressure in the inlet side of the passageway 106 exceeds the load exerted on the valve head by the spring 67 and the back pressure differential created by the increased area of the valve head over the enlarged stem end 68e which is effective to urge the valve head 68a in a closing direction, the valve will open to directly vent the passageway 106 with the chamber 63a which chamber, in turn, of course, is vented back to the passage 106 on the downstream side of the plug 109 via the port 64 as shown in Figure 9.

As shown in Figure 7, the bore 111 in the main passage 106 has ports 120 and 121 on opposite sides thereof each communicating with a side passage. Thus, each port has a circular outlet 120a and 121a surrounded by a valve seat 120b and 121b. Poppet type valves 122 and 123 are operatively mounted in these passages and have had portions coacting with the seats. The valve 122 has a cylindrical projection 122a extending across the passage 107 and slidably seated in the bore 124a of an end cap 124 secured to the casing 105. A seal 125 sealingly engages the cylindrical projection 122a. A spring 126 is bottomed in the cap 124 and acts on the valve 122 to urge it against its seat 120b. A vent 122b is provided through the valve 122 to join the port 120 with the seal space 124a of the end cap so that opposite sides of the valve head will be exposed to the same pressure thereby pressure-balancing the valve in accordance with the effective areas of the opposed valve faces. It will be noted that the valve has a flange in the passage 107 providing a pressure face 122d which is effective to assist the spring 126 in urging the valve into closed position.

The valve has a stem 122c slidable in a bore 127 of a boss provided in the casing in the center of the port 120 and the end of the stem is bifurcated to support a transverse axle pin 128 which carries a roller 129 projecting into the bore 111.

The valve 123 has a similar projection 123a slidably engaged in a similar end cap 130 carrying a seal 131 and receiving the closure spring 132. The head of the valve has a vent 123b therethrough and a stem 123c is slidable in the bore 133 of a boss. A pressure face 123d on the valve head is exposed to pressure in the passage 108 to assist the spring 132 in urging the valve into closed position. The stem end is bifurcated to carry a cross-pin axle 134 supporting a roller 135 which projects into the bore 111 diametrically opposite the roller 129.

The rotary plug 109 has a cam 136 coacting with the rollers 129 and 135. As shown in Figure 8, this cam is positioned on the rotary plug member 109 in the central portion of the bore 111 about midway between the bearings 110 and extends around the periphery of the plug. A radial blade 137 on the plug extends from diametrically opposite sides of the plug along the longitudinal axis of the plug to wipe the bore walls 111. This blade, in the position shown in Figure 7, lies edgewise of the passage 106 so as to accommodate free flow of fluid through the passage. In this position of the blade, the cam 136 has low spots 136a and 136b opposite the rollers 129 and 135. The valve springs 126 and 132 and the pressure bias hold the valves 122 and 123 against their seats 120b and 121b so that the passages 107 and 108 are closed off from the passage 106. This is the free recirculating position of the valve where the fluid in the hydraulic rams is isolated from the fluid being pumped but can flow freely through the valve between corresponding ends of the ram cylinders so that the pressures in corresponding ends of the ram cylinders will always be balanced.

As the plug 109 is rotated in a counterclockwise position from the position shown in Figure 7, to the bulldozer blade lowering position shown in Figure 10, the rising cam surface 136c, adjacent the low spot 136b, will lift the roller 135 to open the valve 123 and thereby establish communication between the passage 108 and the passage 106 downstream from the plug 109. However, the opposed roller 129 is not cam lifted because the cam surface 136d to the left of the low spot 136a is receding from the roller. It will also be noted that the blade 137 is in a position to divert flow from the upstream or pressure side of passage 106 into the port 120 and to allow flow from the port 121 to the downstream side of the passage 106. This will build up pressure on the valve 122. Since the opposite faces of the valve are vented through the bleed 122b and since the portside valve face is of larger effective diameter than the spring-receiving side of the valve face, a pressure differential will be created which is sufficient to open the valve 122 only when it exceeds the spring pressure and the back pressure closing force acting on the face 122d. On the other hand the cam opened valve accommodates flow from the passage 108 to vent fluid from the bottoms of the ram cylinder. Therefore, the valve 123 is opened mechanically by the cam lift 136c while the valve 122 is opened hydraulically only when inlet port pressure is greater than working pressure in the passage 107 which is connected to the tops of the rams 18. The valve 123 has the same difference in valve face areas so that a hydraulic bias assisting the valve springs is obtained in both assemblies for urging the valves into tight or positive seated relation on their valve seats without resorting to the use of very heavy springs.

The purpose of hydraulic actuation of the valve 122 is to prevent a flow-back of oil from the tops of the ram cylinders such as might occur in conditions where the down pressure has placed some weight of the tractor on the bulldozer blade and more down pressure is desired. If the cam cracks both valves 122 and 123 before the valve blade 137 completely seals off the downstream side of the passage 106 from the upstream side as, for example, just before the blade reaches the position shown in Figure 10, the pressure on the pistons in the hydraulic rams from the weight of the tractor could be sufficient to flow oil back to the port 120 and thereby allow the bulldozer blade to raise. By hydraulically operating the valve 122, it cannot be opened until the inlet pressure in the port 120 is greater than the pressure in the passage 107 and this prevents any possible back flow from the passage 107 to the port 120. It is not necessary to make the valve 123 hydraulically operated in this stage because this valve controls flow between the port 121 and the passage 108 which is connected to the bottoms of the ram cylinders.

Therefore counterclockwise rotation of the plug 109 from the position of Figure 7 to the position of Figure 10, will effect lowering of the blade or an initial mechanical opening of the valve 123 to accommodate flow of oil out of the bottoms of the ram cylinders and a build up of hydraulic pressure in the port 120 to open the valve 122 when the port pressure is greater than the pressure in the tops of the hydraulic cylinders so as to force the oil into said tops thereby applying more down pressure on the bulldozer blade.

Figure 11:
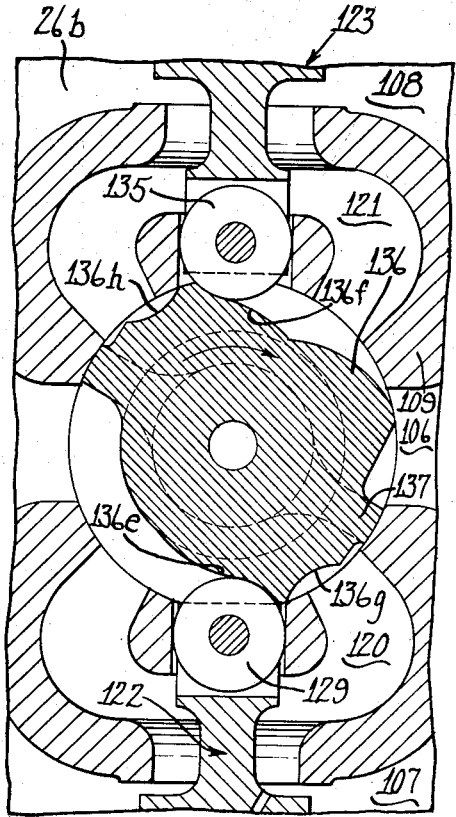

As the plug or vane 109 is rotated in a clockwise direction from the recirculating position of Figure 7, to the bulldozer blade raising position of Figure 11, cam surfaces 136e and 136f respectively, act on the rollers 129 and 135 to open the valves 122 and 123 thereby simultaneously joining the passage 106 with the side passages 107 and 108. This also shifts the blade 137 to divert flow from the upstream side of the passage 106 to the port 121 and through the open valve 123 to the passage 108 which is connected with the bottoms of the hydraulic ram cylinders thereby introducing oil to raise the pistons. At the same time, the oil in the tops of the hydraulic ram cylinders will be vented through the open valve 122 to the downstream side of the passage 106 and back to the reservoir to accommodate shifting of the pistons in the cylinders.

Additional clockwise movement of the plug 109 beyond the position of Figure 11 will move cam recesses 136g and 136h into alignment with the rollers 129 and 135 respectively to receive the rollers therein. In this position of the plug, the blade 137 accommodates free flow of fluid through the passage 106 and to and from the ports 120 and 121 and the cams will hold both valves 122 and 123 in opened position so that the oil can flow freely to and from the cylinders for accommodating floating movement of the pistons in the cylinders. In this position of the valve, therefore, the bulldozer blade rests by gravity on the ground and will be allowed to rise and fall to follow ground contours without interference from the operating rams. The recesses 136g and 136h give the valve a positive "feel" for the float position and the operator of the sender can sense when the operating handle has been moved to a position for shifting the valve to this float condition. The recesses 136g and 136h will hold the valves 122 and 123 opened and will hold the plug 109 in the full open flow position until the sender is positively shifted to force the receiver to shift the plug.

It will, therefore, be understood that rotation of the valve plug in one direction applies down pressure to the bulldozer blade by flowing oil to the tops of the hydraulic rams and by venting the oil out of the bottoms of the rams. Rotation of the plug in the opposite direction admits fluid under pressure to the bottoms of the rams for raising the blade and vents the fluid out of the tops of the rams to permit the piston movement in the cylinders. Continued rotation of the valve in this same direction beyond a raising position will shift the plug to a "float" position where it will be held by cam recesses until the sender is manipulated to reverse the rotation of the plug.

In the recirculating position of the valve as shown in Figure 7, the positive acting poppet valves are closed and the oil is locked in the respective ends of the hydraulic rams. In this condition, the oil is free to recirculate through the valve along an unimpeded passage which will not produce an appreciable rise in temperature of the oil.

*The back pressure valve*

Figure 12:
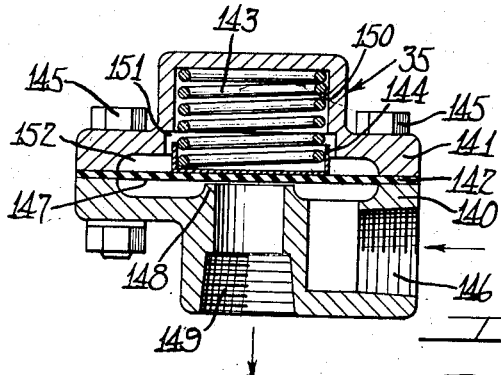
Figure 12 is a longitudinal cross-sectional view of a back pressure valve in the fluid return line from the sender.

As shown in Figures 1 and 12, the back pressure valve 35 is provided in the return line from the sender to the tank to eliminate syphoning of the hydraulic oil out of the sender at a rate faster than it is received by the sender when the tank level is appreciably lower than the sender level. Under certain digging conditions of the bulldozer machine 11, it is possible that the oil tank 21 at the front of the tractor, may be considerably lower than the sender 33 at the operator's seat near the rear end of the tractor. In order to prevent syphoning of the oil out of the sender, the valve 35 automatically closes whenever the back pressure in the return line 34 drops below a predetermined minimum. The valve 35 includes a body 140, a cap 141, a diaphragm 142 between the cap and body, a spring 143 in the cap acting through a follower 144 on the diaphragm 142 and nut and bolt assemblies 145 securing the cap to the body and clamping the marginal periphery of the diaphragm. The body has an intake port 146 receiving fluid from the sender chamber 36a. A diaphragm chamber 147 communicates with the port 146 and has a valve seat 148 in the central portion thereof controlling flow to an outlet port 149. The diaphragm overlies the chamber 147 and the valve seat 148.

The cap 141 has a dome providing a spring chamber 150 which is counterbored at 151 to receive the follower 144. The counterbore 151 communicates with a diaphragm chamber 152. The spring 143 acts through the follower 144 on the central portion of the diaphragm 142 to seat the diaphragm on the valve seat 148 thereby separating the inlet port 146 from the outlet port 149. Pressure from the inlet port 146 in the chamber 147 acts on the diaphragm against the load of the spring to unseat the diaphragm and open up the port 149.

The spring-closing bias on the diaphragm can be set for any desired load such as for example, one-half pound gage pressure. Under such setting, the oil in the sender chamber 36a can never be at a pressure less than one-half pound even though the tank level is such as to create a suction at the port 149.

The valve 35 is, therefore, a vacuum-breaker valve which prevents any possibility of emptying the sender chamber even under abnormal operating conditions of the bulldozer machine.

*Summary*

From the above descriptions, it will be understood that this invention now provides a hydraulic system wherein the hydraulic fluid supply tank, the pump, the main control valve, and the hydraulic motors such as rams or cylinder and piston machines, are closely grouped to eliminate heretofore required long high-pressure lines and return lines. The system of this invention is hydraulically controlled from any remote point selected for the positioning of the sender unit. This sender unit operates on the same fluid that is circulated through the main flow circuit of the system. The conduits between the sender and the receiver of the main valve can be relatively light-weight tubes because they are not subjected to the high pressures developed by the main circuit in the system while at the same time, being fed from the main circuit but only at the back pressure maintained in the system. If desired this back pressure would be increased by an orifice in the return circuit from the valve to the tank but the ordinary throttling effect of the return conduit and the high discharge level back to the tank will usually be sufficient to establish a desired back pressure. Excessive high pressures on the inlet side of the valve, of course, are relieved by the by pass or relief valve 68.

The sender, in its neutral position, receives operating fluid freely therethrough and has balanced pistons which are easily manually displaced to trap the circulating fluid and force movement of a receiver which in effect serves as a piston and cylinder actuator that operates the main rotary valve. The receiver is equipped with automatic self-dumping mechanisms which will eliminate excess trapped fluid in the event that displacement effected by movement of the sender pistons is greater than that required for the desired movement of the receiver pistons.

The main flow control valve is a rotary blade type unit with positively actuated poppet valves. This main valve has free unimpeded passages for circulation of the hydraulic fluid therethrough and the blade in the main passage has a cam control for the poppet valves such that the fluid may be diverted from the recirculating passage to and from the hydraulic motors as controlled by the sender.

It will be understood that variations and modifications may be effected without departing from the scope of the novel concepts of this invention.

I claim as my invention:

1. Fluid control mechanism adapted for a tractor-mounted bulldozer or the like implement including a pair of double-acting hydraulic rams at the front end of the tractor body for operating the implement, a tank for hydraulic fluid mounted in front of the tractor radiator, a pump mounted directly adjacent the power take-off at the front of the tractor and driven by the tractor engine, a conduit joining the inlet of the pump with the lower portion of the tank, a rotary blade type control valve mounted adjacent said pump having first and second working fluid passages and a third recirculating passage, conduits connecting opposite ends of the first passage with the upper ends of the hydraulic ram cylinders, conduits connecting the opposite ends of the second passage with the lower ends of the hydraulic ram cylinders, an inlet pipe connecting the outlet of the pump with one end of the third passage, an outlet conduit connecting the opposite end of the third passage with the tank at a level above the conduit connecting the tank with the inlet of the pump, a receiver mounted on said valve and communicating with said third passage, said receiver having oppositely spaced cylinders, opposed pistons received in said cylinders, a cross-head and crank assembly connecting the opposed pistons with the blade of the rotary valve for rotating the blade in opposite directions in response to opposite reciprocations of the pistons, a sender mounted on the tractor adjacent the operator's seat, oppositely spaced cylinders in said sender, opposed pistons received in said cylinders, an operating handle for shifting said pistons, tubes connecting said cylinders of said receiver and said cylinders of said sender for flowing fluid from the receiver to the sender and back to the tank, said pistons in said sender being operable to trap said fluid when the pistons are displaced by said handle to displace the receiver pistons for rotating the blade of the main valve to divert fluid circulating through said third passage and into and out of the other passages to drive the rams.

2. A fluid control system for a vehicle-mounted implement having hydraulic ram means for operating the implement including a fluid supply tank, a vehicle-driven pump, and a main control valve closely grouped on said vehicle adjacent said hydraulic ram means, conduit means through which said pump delivers hydraulic fluid from said tank to said valve, a receiver adjacent said valve for shifting the valve, said receiver receiving hydraulic fluid from said valve, a sender mounted on the vehicle adjacent the operator's seat, tubes connecting the receiver and sender, conduits connecting corresponding ends of the hydraulic ram means with corresponding passages in the valve, means for maintaining a predetermined back pressure for fluid circulating from the receiver through the sender back to the tank, fluid trapping and displacing mechanism in said sender and a manual control member for actuating said displacement mechanism to shift the receiver for changing the valve setting thereby diverting fluid to said hydraulic ram means to operate said implement.

3. A hydraulic control system for vehicle-mounted implements having double-acting hydraulic ram operators for the implements which comprises a hydraulic fluid tank mounted adjacent the operators, a pump driven by the vehicle mounted adjacent the tank, a main control valve mounted adjacent the pump, a receiver for operating said control valve mounted on the control valve, passage means permitting fluid flow between said receiver and said tank, said control valve having a free flow passage therethrough connecting the outlet of the pump with the tank for free circulation of hydraulic fluid through the pump, said valve having additional passages communicating with opposite ends of the hydraulic ram operators, a rotary plug device in said valve for diverting flow from the free flow passage to the additional passages to drive the ram operators, a sender at the driver's station of the vehicle, tubes connecting the receiver with the sender for flow of fluid through the receiver and back to the tank, fluid trapping and displacing means in the sender for actuating the receiver to shift the valve, and a single operating handle for said trapping and displacing means.

4. In a fluid control mechanism for cylinder operated bulldozer machines including an engine driven tractor having a pair of hydraulic rams pivotally mounted at the front end thereof and a bulldozer blade controlled by said rams together with an engine radiator between the rams, the combination comprising a U-shaped oil tank mounted in front of the radiator having a pair of depending legs at the sides of the radiator and a bight portion at the top of the radiator, a pump mounted in front of the radiator, a feed conduit connecting the bottoms of said legs of the tank with the pump inlet, a main control valve having an inlet connected to the outlet of the pump and an outlet connected to both legs of the tank at levels above the bottoms of the legs, said valve having passages connected with opposite ends of the hydraulic rams, rotary means in said valve for diverting fluid into and out of said passages to operate the hydraulic rams, a receiver on the valve for actuating the rotary valve means, passage means permitting circulation of hydraulic fluid from said tank to said receiver, a sender on the tractor adjacent the drivers station, tubes connecting the receiver and sender for flow of fluid from the receiver to opposite ends of the sender, a return tube connecting the central portion of the sender to the tank, and fluid trapping and displacement means in said sender for actuating the receiver to drive the rotary valve means for changing the valve setting.

5. A hydraulic control system for vehicle mounted implements having double-acting hydraulic ram operators for the implements which comprises a hydraulic fluid tank mounted adjacent the operators, a pump driven by the vehicle mounted adjacent the tank, a main control valve mounted adjacent the pump, a receiver for operating said control valve mounted on the control valve, passage means permitting circulation of hydraulic fluid from said tank to said receiver, said control valve having a first free flow passage therethrough connecting the outlet of the pump and the tank for free circulation of hydraulic fluid through the pump, said valve having working passages communicating with opposite ends of the hydraulic ram operators, a rotary plug device in said valve for diverting flow from the first passage to the working passages to drive the ram operators, a sender at the operator's station of the vehicle, tubes connecting the receiver with the sender for flow of fluid through the receiver and back to the tank, fluid trapping and displacing means in the sender for actuating the receiver to shift the valve, and a single operating handle for said trapping and displacing means.

6. In a fluid control mechanism for hydraulic cylinder operated bulldozer machines including an engine driven tractor having a pair of hydraulic rams pivotally mounted at the front end thereof and a bulldozer blade controlled by said rams together with an engine radiator between the rams, the combination comprising; a U-shaped oil tank mounted in front of the radiator having a pair of depending legs at the sides of the radiator and a bight portion at the top of the radiator, a pump mounted in front of the radiator, a feed conduit connecting the bottoms of said legs of the tank with the pump inlet, a main control valve having an inlet connected to the outlet of the pump and an outlet connected to both legs of the tank at levels above the bottoms of the legs, said valve having passages connected with opposite ends of the hydraulic rams, rotary means in said valve for diverting fluid into and out of said passages to operate the hydraulic rams, a receiver on the valve for actuating the rotary valve means, passage means permitting fluid to flow from said tank to said receiver, a sender on the tractor adjacent the operator's station, tubes connecting the receiver and sender for flow of fluid from the receiver to opposite ends of the sender, a return tube connecting the central portion of the sender to the tank, and fluid trapping and displacement means in said sender for actuating the receiver to drive the rotary valve means.

7. A hydraulic control mechanism which comprises a main flow control valve, a receiver actuating said valve, a sender remote from said receiver, said receiver and said sender each having opposed piston and cylinder assemblies, means connecting the outlet side of the main valve with the receiver to supply fluid to both piston and cylinder assemblies of the receiver, separate tubes connecting each receiver piston and cylinder assembly with a corresponding sender piston and cylinder assembly, check valve means in said receiver accommodating flow of fluid from the receiver to the sender, a return tube discharging fluid from the sender, and a manual actuator for the sender to displace said pistons to trap fluid and move the trapped fluid to close a check valve and force movement of the corresponding receiver pistons to shift the main valve.

8. A hydraulic control valve assembly which comprises a main flow control valve having a rotary plug controlling flow through the valve, a receiver having a piston and cylinder assembly, passage means permitting fluid flow from the downstream side of the valve to said receiver, a crank and crosshead connection between said piston and said plug to rotate the plug in response to reciprocating movement of the piston, a sender remote from the receiver, conduit means connecting the receiver and sender, a return tube discharging fluid from the sender, and fluid trapping and displacement means in said sender for effecting a shifting of the receiver piston to change the setting of the valve.

9. A self-charging remote controlled hydraulic valve mechanism which comprises a supply tank, a pump receiving hydraulic fluid from said tank, a main control valve receiving fluid under pressure from the pump, a return conduit connecting the valve back to the tank, a receiver having valve shifting mechanism therein actuated by fluid received from the downstream side of the valve, a remote sender, conduit means connecting the receiver and sender to flow fluid from the receiver to the sender, a return conduit connecting the sender back to the tank whereby some of the fluid from the main valve will flow through the receiver and sender back to the tank at the back pressure of the downstream side of the valve, and fluid trapping and displacing mechanisms in said sender to shift the receiver for driving the valve.

10. A remote controlled hydraulic valve assembly which comprises a main valve, a piston and cylinder actuator for actuating said main valve with hydraulic fluid received from the main valve, a remote sender for controlling said actuator, means for flowing fluid from the actuator to the sender, and fluid trapping and displacing means in said sender for reversely actuating the trapped fluid to drive the actuator for controlling the position of the main valve.

11. A remote controlled hydraulic valve assembly which comprises a main valve having a casing with a free flow fluid recirculating passage therethrough and working fluid passages on opposite sides of the recirculating passage, a rotary plug member in said recirculating passage having a blade accommodating free flow of fluid through the recirculating passage and adapted to divert said flow into and out of the working passages, a cam on said rotary plug, poppet valves interposed between the recirculating passage and the working passages, means biasing said poppet valves into closed positions, a receiver casing mounted on said main valve casing and adapted to receive fluid from the recirculating passage downstream from the rotary plug, a pair of opposed cylinders in said receiver casing, a piston unit having its opposite ends slidably mounted in said cylinders, means drivingly connecting the central portion of the piston unit with said plug to rotate the plug in response to reciprocation of the unit, passages connecting the receiver chamber with the outer ends of the cylinders, check valves interposed in said passages, a sender casing remote from said receiver casing, opposed cylinders in said receiver casing, tubes connecting the outer ends of the receiver cylinders with the outer ends of the sender cylinders, a piston unit having opposite ends slidable in the cylinders in the sender casing, ports in said sender pistons accommodating flow of fluid received from the receiver, an outlet for said sender to discharge the fluid from said ports, a manually shiftable control member for displacing said sender pistons to close said ports and trap fluid between the receiver and sender pistons and to then displace the trapped fluid for shifting the receiver pistons to effect movement of the rotary plug.

12. A flow control valve which comprises a main valve casing having a recirculating passageway therethrough and working fluid passageways on opposite sides of the recirculating passageway, a rotary plug mounted in the recirculating passageway having a blade for directing flow between the recirculating passageway and the working passageways, an actuator for said rotary plug having a chamber receiving fluid from the downstream side of the recirculating passageway, a pair of opposed cylinders in said chamber, a piston assembly having opposed pistons slidable in said cylinders, a crosshead and crank connection uniting the piston and the rotary plug for rotating the plug in response to reciprocation of the piston, and hydraulic means for shifting the piston assembly in the cylinders to drive the plug for changing the setting of the valve.

13. A hydraulic valve which comprises a valve casing having a central recirculating flow passageway therethrough and a pair of working fluid passageways on opposite sides of the recirculating passageway, a rotary plug mounted in said recirculating passageway, a radial blade extending from diametrically opposite sides of said plug for directing fluid, a spring-loaded poppet valve controlling flow between the recirculating passageway and each of the working fluid passageways, cam means on the rotary plug actuating said valve and one of said valves having opposed faces of unequal area vented to inlet port pressure to create a hydraulic unbalance to open the valve when the pressure differential between the recirculating passage and the working fluid passage controlled by said valve exceeds a predetermined amount.

14. A hydraulic valve which comprises a casing having an inlet port, an outlet port, a pair of working fluid ports, and a rotary plug controlling flow between said ports, spring-loaded poppet type valves controlled by said rotary plug between the inlet port and the working ports, cam means on said plug for unseating said valves, and at least one of said valves having opposed faces of unequal area vented to inlet port pressure for unseating the valve whenever the pressure differential between the inlet port and the working fluid exceeds a predetermined amount whereby fluid in the inlet port must be at a higher pressure than fluid in the working port controlled by the valve before the valve will open.

15. A hydraulic valve which comprises a main valve casing having an inlet port, an outlet port and a pair of working fluid ports, a rotary plug between the inlet and outlet ports having a fluid directing blade controlling flow between the inlet and outlet ports and the working ports and offering a minimum of resistance to free flow between the inlet and outlet ports, an actuator for said rotary plug having a chamber receiving fluid from the outlet port side of the plug, a relief valve connecting the inlet port side of the plug with said chamber, means biasing said relief valve into closed position, a piston and cylinder assembly in said chamber including check valve controlled passages for flow of fluid through the pistons out of the chamber, and means for trapping the fluid flowing out of the chamber and for displacing the trapped fluid to shift the pistons for driving the rotary plug to change the valve setting.

16. A valve control mechanism which comprises a casing having an inlet port for hydraulic fluid and a pair of outlet ports, opposed cylinders interposed between the inlet and outlet ports, a piston assembly having opposed pistons slidable in said cylinders, passages through the piston assemblies connecting the inlet and outlet ports, check valves spring-biased into closed position in said pistons adapted to be unseated by inlet port pressure, means for trapping fluid in the outlet ports, and means for displacing the trapped fluid to close the check valves and shift the piston assembly.

17. A valve actuator which comprises a casing having a chamber with an inlet port and a pair of outlet ports, open-ended cylinders between the inlet and outlet ports, a piston assembly having pistons slidable in said cylinders, passages in said piston assembly connecting the inlet and outlet ports, check valves in said passages, dump ports in said pistons adapted to be exposed when the pistons are displaced beyond the ends of the cylinders to relieve fluid in the outlet ports, and means for displacing fluid in the outlet ports to close the check valves and shift the pistons whereby excess displaced fluid will be dumped through said ports as soon as the pistons move beyond the inner ends of the cylinders.

18. An actuator for a control valve or the like which comprises a casing having an inlet port and a pair of outlet ports, opposed open-ended cylinders between the inlet and outlet ports, a piston assembly having opposed pistons slidable in said cylinders, passages through said piston assembly connecting the inlet port with the outlet ports, check valves carried by said pistons closing said passages, and means for opening said check valves upon excessive displacement of the pistons with trapped fluid in the outlet ports for relieving the excess displacing fluid.

19. An actuator for a hydraulic control valve or the like which comprises a casing having an inlet port and a pair of remote outlet ports, open-ended cylinders loosely carried by said casing, seals at the outer ends of the cylinders accommodating cocking of the cylinders without permitting leakage around the cylinders, a valve actuating piston assembly having a pair of pistons at the opposite ends thereof slidably mounted in said cylinders, passages accommodating flow of fluid from the inlet port to the outlet ports, check valve means arresting return flow of said fluid, and means for trapping and displacing fluid at the ends of the pistons to shift the pistons for actuating the control valve.

20. A sender for a hydraulic valve which comprises a casing having a central outlet port and a pair of remote inlet ports on opposite sides of the outlet port, a pair of cylinders carried by the ends of said casing in tiltable relation, seals acting on said cylinders to stop leakage around the cylinders, a piston unit having pistons at the ends thereof slidable in said cylinders, ports in the cylinders and pistons adapted to vent fluid from the inlet ports to the outlet port when the cylinder and piston ports are aligned, opposed spring means acting on said piston assembly to align said piston and cylinder ports, and manually actuated means for displacing the piston assembly to misalign the ports and trap the fluid in the inlet ports.

21. In a hydraulic control unit a casing having apertured end walls, flanged cylinders projecting into said casing through the apertured end walls, end caps overlying the end walls and bottoming the cylinder flanges against the end walls to project the cylinders into the casing in aligned spaced relation, a piston unit having hollow end pistons slidable in the cylinders, pins bottomed in the end caps projecting into said pistons, a washer slidable on each pin bottomed on the piston, a spring on each pin acting on the washer to urge the piston toward the inner end of the cylinder, and abutments at the ends of the pin to hold the spring at a fixed expanded length to exert a positive piston centering action for holding the piston unit in the central portion of the casing.

22. In a hydraulic control unit, a pair of opposed cylinders, a piston unit having hollow pistons at the ends thereof slidable in the cylinders, a check valve in each piston biased toward the center of the piston unit, means for flowing fluid from the center of the piston unit through the hollow pistons past the check valves to the outer ends of the cylinders, means for selectively trapping said flow beyond the outer ends of each cylinder and for reversely flowing the fluid to close the check valve of the piston in the selected cylinder to drive the piston into the cylinder, and means on the check valves for opening the valves to dump excess trapped fluid whenever a piston moves to a predetermined position in its cylinder.

23. A control valve comprising a casing having a first fluid passage, a pair of working fluid passages, spring-loaded poppet valves controlling flow between the first passage and each of the working fluid passages, a flow directing blade in the first passage accommodating free flow through the passage in a first position, diverting flow from the first passage into one working passage and out of the other working passage in a second position, diverting flow from the first passage into said other working passage and out of said one working passage in a third position and accommodating flow to and from all passages in a fourth position, and means controlled by said blade to selectively open and close the poppet valves to accommodate said flows in the four positions of the valve.

References Cited in the file of this patent

UNITED STATES PATENTS

| | | |
|---|---|---|
| 2,342,770 | Temple | Feb. 29, 1944 |
| 2,360,987 | Temple | Oct. 24, 1944 |
| 2,426,212 | Hedene | Aug. 26, 1947 |
| 2,543,989 | Rockwell | Mar. 6, 1951 |
| 2,694,384 | Evans | Nov. 16, 1954 |